United States Patent [19]
Schanin et al.

[11] Patent Number: 5,129,866
[45] Date of Patent: Jul. 14, 1992

[54] METHOD AND DEVICE FOR PRODUCING ENDLESS DRIVE BELTS

[75] Inventors: Jonathan Schanin, Haifa; Shmuel Harel, Kibbutz Machanim, both of Israel

[73] Assignee: Fenrir AG, Zug, Switzerland

[21] Appl. No.: 795,298

[22] Filed: Nov. 20, 1991

Related U.S. Application Data

[63] Continuation of Ser. No. 526,562, May 21, 1990, abandoned.

[51] Int. Cl.⁵ .............................................. F16G 1/08
[52] U.S. Cl. .................................. 474/264; 474/268
[58] Field of Search ............................. 474/260–266, 474/268, 269, 271; 156/137

[56] References Cited

U.S. PATENT DOCUMENTS

| | | | |
|---|---|---|---|
| 2,446,310 | 8/1948 | Steinke | 474/264 X |
| 2,726,976 | 12/1955 | Waugh | 474/264 X |
| 3,164,026 | 1/1965 | Terhune | 474/264 |
| 3,656,360 | 4/1972 | Fix | 474/265 X |
| 3,792,621 | 2/1974 | Smith | |
| 3,847,029 | 11/1974 | Ray | |
| 3,919,025 | 11/1975 | Ray | |

FOREIGN PATENT DOCUMENTS

| | | |
|---|---|---|
| 870183 | 1/1953 | Fed. Rep. of Germany |
| 2361244 | 12/1977 | Fed. Rep. of Germany |
| 2058764 | 9/1979 | Fed. Rep. of Germany |
| 886754 | 1/1962 | United Kingdom |

*Primary Examiner*—Thuy M. Bui
*Attorney, Agent, or Firm*—John D. Kaufmann

[57] ABSTRACT

The endless drive belt is produced by winding a preformed load-carrying member comprising a cord embedded in a solid but softenable elastic material along and around a surface of an endless compression member belt also comprising a solid but softenable elastic material, thereby forming layer comprising a plurality of turns, and by simultaneously causing said turns to become intimately bonded to said surface. Said bonding is achieved by applying mutual pressure between said turns and said surface during winding and by selectively softening the surface layers of both said load-carrying member and said endless compression member belt which are to come into contact with each other, just prior to coming into contact with each other. The material of said surface layers is allowed to fuse. Said turns of said load-carrying member are further allowed to be partially impressed in said surface of said endless compression member belt. Softening may be carried out by the application of heat and/or the application of an adhesive. A device for carrying out the above method is also disclosed. With the device disclosed endless drive belts may be easily produced in-house at the time they are required at any size and at minimal costs and capital outlay.

32 Claims, 2 Drawing Sheets

METHOD AND DEVICE FOR PRODUCING ENDLESS DRIVE BELTS

This is a continuation of copending application Ser. No. 07/526,562 filed on May 21, 1990, now abandoned.

TECHNICAL FIELD

The present invention relates to a method for producing an endless drive belt from elastomeric belting. It also relates to an endless drive belt, and to a device for applying the method according to the invention.

DESCRIPTION OF THE PRIOR ART

Open-ended elastomeric belting complete with embedded load-carrying cording made of such high-strength materials as cotton, rayon, polyester and the like is well-known and has been extensively used in the past. The difficulties with this type of belting arise, however, when lengths of pre-formed open-ended belting, cut to size, have to be joined to form endless belts. While the ends of a thermoplastic belting body are easily joined by application of heat or adhesives, the problem arises with the load-carrying cords. Here, any number of methods have been proposed, involving splices, overlaps, overlays, inlays, etc., none of which give really satisfactory results, producing as they do regions of different stiffness, increased minimum bending radii, vibrations and noise, and, altogether, reduced belt strength and service life, as well as increased wear of pulley bearings.

In view of the above, methods have been devised whereby an endless layer of reinforcing and load-carrying material is applied to the elastomeric belting after the latter has been joined to form an endless belt.

Thus, in German Patent No. 2,361,244 and U.S. Pat. No. 3,847,029 Ray discloses a method whereby an extruded strip consisting of a plurality of belt body elements integrally arranged side by side is wrapped around a core drum and welded to constitute an endless sleeve. After welding the sleeve is allowed to cool to ambient temperature. Each belt body element is provided on its top surface with a channel confined by means of projections into which is wound, in a plurality of turns, an open-ended length of a load-carrying cord. The cord is coated during winding with a molten or liquid thermoplastic elastomer. By means of a heating device the coated cord is heated during winding to assure that the temperature of the thermoplastic elastomer is kept above its melt temperature at least until winding is finished. By the molten or liquid coating the channels are substantially filled and the cord comes into direct contact with the bottom surface of the channels recesses. After winding and cooling below the melt temperature, the sleeve is sliced to produce a plurality of separate belts.

This method, however, has several drawbacks. The apparatus required is heavy and complex. A given core drum can Produce only one belt size. For the liquid coating of the cord an applicator device is required such as an extruder which needs industrial support systems, room, etc. It is expensive to install and run. This method is therefore not suitable for shops and factories, small and large, which in order to avoid the need to keep s costly stock for different drive-belt sizes, want to be able to produce their own belts only if and when required.

As further drawback the molten or liquid elastomer will not fully remain in the channels as the core drum rotates during winding, but will drop from the underside thereof. The elastomer does not sufficiently adhere to the surface of the channels. The solidification conditions of the cord coating are uncontrolled and different for different turns of the cord.

SUMMARY OF THE INVENTION

It is one of the objects of the present invention to overcome the draw-backs and disadvantages of the prior art method and to provide a method for producing an endless drive belt from at least partially open-ended elastomeric belting, that facilitates preparation of improved endless drive belts of practically uniform strength and stiffness along their entire length, by virtue of their load-carrying members being jointless and that permits the use of relatively simple and inexpensive equipment adapted to process pre-formed, open-ended components.

According to the invention this is achieved by providing a method for producing an endless drive belt, comprising the steps of providing a pre-formed compression member profile comprising a solid but softenable elastic material comprising a first elastomer, winding a pre-formed load-carrying member comprising a cord embedded in a solid but softenable elastic material comprising a second elastomer being fusible with said first elastomer, along and around a surface of said compression member belt thereby forming a layer comprising a plurality but at least more than one full turn, and simultaneously causing the turns of said wound layer of said load-carrying member to become intimately bonded to said surface of said endless compression member belt by applying mutual pressure between said turns and said surface and by selectively softening of surface layers of both said load-carrying member and said endless compression member belt which are to come into contact with each other just prior to coming into contact with each other to at least such degree to allow the material of said surface layers under the mutual pressure applied to fuse and further to allow said turns to be at least partially embedded or impressed in said surface of said endless compression member belt.

It is a further object of the invention to provide a drive belt easily produced at any required size and at minimal costs and capital outlay.

According to the invention, this is achieved by providing an endless drive belt, comprising a compression member belt having a surface and comprising a solid but softenable elastic material comprising a first elastomer, and a load-carrying layer, constituted by a plurality but at least more than one full turn of load-carrying member wound along and around said surface of said compression member belt, said load-carrying member comprising a cord embedded in an envelope comprising a solid but softenable elastic material comprising a second elastomer being fusible with said first elastomer, wherein said turns of said wound layer of said load-carrying member are intimately bonded to said surface of said compression member belt, the interface between said turns and said surface comprising fused material from both an adjacent surface layer of said envelope of said cord of said load-carrying member and an adjacent surface layer of said surface of said compression member belt, said turns being at least partially embedded or impressed in said surface.

It is yet another object of the present invention to provide a relatively simple and inexpensive device for carrying out the method according to the invention which would permit in-house preparation of drive belts of any size as an economical proposition.

According to the invention, this is achieved by providing a device for producing an endless drive belt from pre-formed members, said members at least including a compression member belt and a load-carrying member comprising a solid but softenable elastic material each, the device comprising a belt-building pulley having a width just matching the width of at least one single compression member belt, drive means for rotating said belt-building pulley, an idler pulley arranged in alignment with said belt pulley and at a variable center distance therefrom, means to adjust said variable center distance to provide an appropriate tension in said compression member belt when mounted between said belt-building pulley and said idler pulley, pressurizing means for the application of mutual pressure between said compression member belt and said load-carrying member during winding thereof onto the outer surface of said compression member belt by rotation of said belt-building pulley, softening means for selectively softening of surface layers of both said load-carrying member and said compression member belt which are to come into contact with each other during winding just prior coming into contact with each other to at least such degree to allow the material of said surface layers under the mutual pressure applied to fuse and further to allow the turns of said load-carrying member to be at least partially embedded or impressed in said surface of said compression member belt.

BRIEF DESCRIPTION OF THE DRAWINGS

Preferred embodiments of the invention will now be described with reference to the following illustrative figures. In the drawings.

DESCRIPTION OF THE PREFERRED EMBODIMENTS

Figure 1:
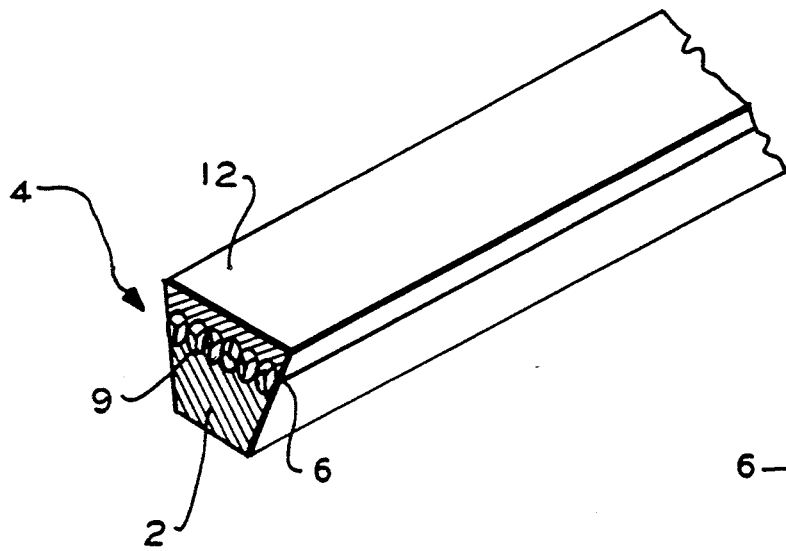
FIG. 1 is a perspective view showing the cross section of a drive belt produced by the method according to the invention.

Referring now to the drawings, there is seen in FIG. 1 a first embodiment of a plain V-belt produced by the method according to the invention.

The V-belt of FIG. 1 comprises a body member, known in the art as compression member, 2, and of a load-carrying layer 4 composed of several turns of a load-carrying member 6 which turns, in a method step to be discussed further below, have been intimately bonded both to the compression member 2 and to one another. The compression member 2 is made of or at least comprises a solid but softenable elastic material comprising a first elastomer. The load-carrying member 6 consists of a reinforcing, high-strength cord 8 embedded in an envelope 10 made of or at least also comprising a solid but softenable elastic material comprising a second elastomer. Both said first and said second elastomers are fusible with each other and are preferably thermoplastic elastomers such as polyurethanes (e.g. ESTANE by B.F. Goodrich), polyesters (e.g. HYTREL by Dupont), olefins (e.g. LEVAFLEX by Bayer) or alloys (e.g. SANTOPRENE by Monsanto).

Further seen is a so-called tension member 12, an optional component bonded to the layer 4 of load-carrying members 6. The tension-member 12 is also made of or at least comprises solid but softenable elastic material comprising a third elastomer. Said third elastomer is fusible with at least said second elastomer and is preferably a thermoplastic elastomer of the kind as mentioned above, too.

While the tension member 12 in FIG. 1 is flat and smooth, tension members in, e.g., conveyor-belt applications may have non-rectangular, e.g., triangular cross sections, or may have a riffled surface.

Figure 2:
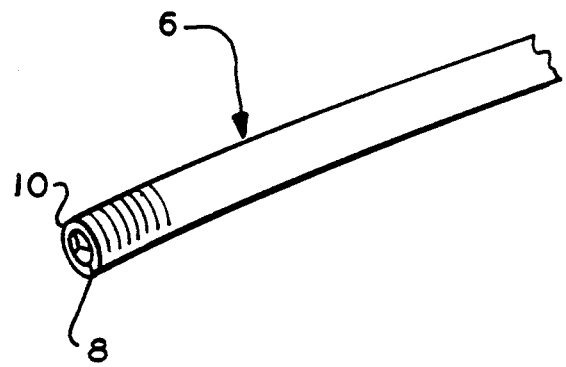
FIG. 2 shows a perspective view of a load-carrying member according to the invention.

The load-carrying member 6 represented in FIG. 2, pre-formed by conventional methods in open-ended reels, has a circular cross section and consists of a reinforcing cord 8 firmly embedded and enveloped in the above defined material 10 being compatible with material of the compression member 2, which has also been defined above. The cord 8 itself is made of high-strength materials such as cotton, rayon, polyester or aramid. Prior to embedding, the reinforcing cord 8 is advantageously coated with a primer such as an aqueous epoxy primer and an adhesive such as a polyurethane adhesive and may also be thermally treated for improved mechanical properties.

In certain applications, the cord 8 may be produced by twisting or braiding together at least two materials: one of high strength and one of good natural adhesion to the material of the envelope 10.

Figure 3:
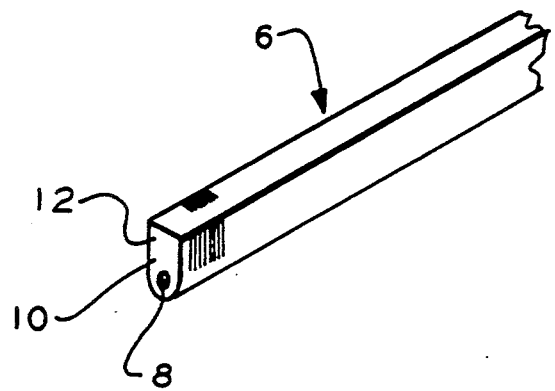
FIG. 3 is a perspective view of an embodiment incorporating a tension member with load-carrying member.

Embodiment of FIG. 3 incorporates the tension member 12 with the load-carrying member 6 to a single pre-formed member.

Figure 4:
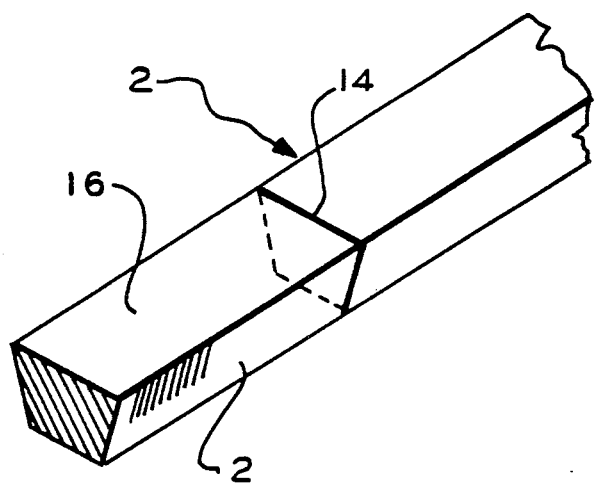
FIG. 4 illustrates a butt joint joining the ends of the compression member of a V-belt profile.

As already mentioned, all belt components: the compression member 2, the load-carrying member 6 and the (optional) tension member 12 are pre-formed by conventional methods such as extrusion, casting or molding. Setting out from these preformed components, the method according to the invention proposes the following steps:

A piece of compression member 2 is cut to the required length as determined by the respective pulley diameters and center distance. Preferably, the free ends of the piece are then joined to form as in FIG. 4 for example, a butt joint 14. The actual joining method may be selected to best suit the properties of the material of the compression member 2 and the availability of tooling. Thus, for thermoplastic materials, joining can be effected by having both ends contact hot plate or blade and then pressing the ends one against the other. Alternatively, a jet of hot air may be used or indeed any of the bonding technologies known which combine heat and pressure.

Another alternative for bonding is the use of adhesives, a method which is not restricted to thermoplastic materials and may be applied also to vulcanized rubber, cross-linked polyurethane and others.

Other embodiments of the compression member are possible including molded endless members, open ended (without bond) members, etc.

After the open-ended piece of compression member has been turned into an endless belt by the above discussed joining of the ends, the load carrying member 6, drawn off a reel of the pre-formed component is wound in a continuous spiral with the turns close to each other onto, and longitudinally around, the top surface 16 (FIG. 4) of the compression member 2, preferably substantially covering the width of the latter. Pressure forcing the load-carrying member 6 onto the belt surface 16 is applied during this winding. The pressure may be produced by keeping the load-carrying member 6 taut while winding or by means of at least one floating roller. During the winding stage in addition surface layers of both said load-carrying member and said compression member belt which are to come into contact with each other are simultaneously and selectively softened just prior to coming into contact with each other. Said softening is carried out by the application of heat and/or of an adhesive.

The heat or adhesive, and pressure, applied causes an intimate bond to be formed between a) the load-carrying member 6 as it is being laid down and the belt surface, and b) between the new turn and the previous turn of the load-carrying member 6. After the above-described application of the load-carrying layer 4, the interface between the load-carrying member 6 of this layer and the belt surface 16 consist in fact of fused material from both the softened surface layer of the cord envelope 10 and the softened material of the belt surface. Also, due to the winding pressure applied, the load-carrying members 6 will be at least partially embedded or impressed in the belt surface 16, the groove-like impressions 9 being clearly seen in FIGS. 1 and 6. The load-carrying members should be impressed in the belt surface to a degree of at least 20%. Preferably no hollow spaces should remain between adjacent turns.

Preferably the thickness of the softened surface layer of the load-carrying member 6 is smaller than the thickness of the envelope 10 of cord 8 in order not to deteriorate the adhesion between the cord and its envelope, which preferably has been optimized during the pre-forming stage of the load-carrying member. To achieve this, a highly selective and well timed application of heat and/or of an adhesive is required.

It is further preferred to have the amount of heat and/or of an adhesive and the amount of pressure applied adjusted in such way to obtain an optimal winding velocity.

Yet another method of producing the load-carrying layer 4 is the simultaneous winding of several load-carrying members 6 Producing multiple ends and thus reducing the required time for preparing a drive belt.

A similar procedure is followed for applying the optional tension member 12, except that this member is obviously not applied spirally, but straight and in most cases in the form of one turn only. Using a member as shown in FIG. 3 the load-carrying member and the tension member are applied in one step only.

Figure 6:
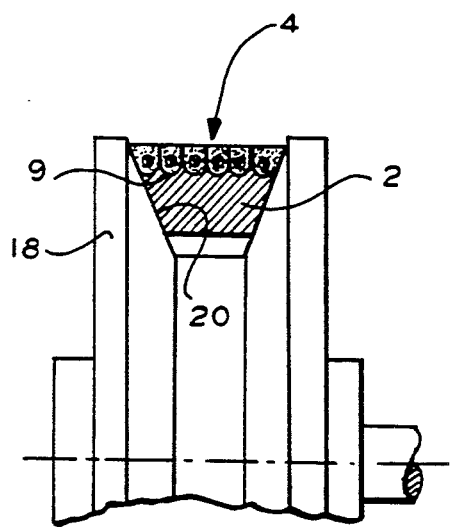
FIG. 6 is a partial view of the molding pulley of the device.
Figure 5:
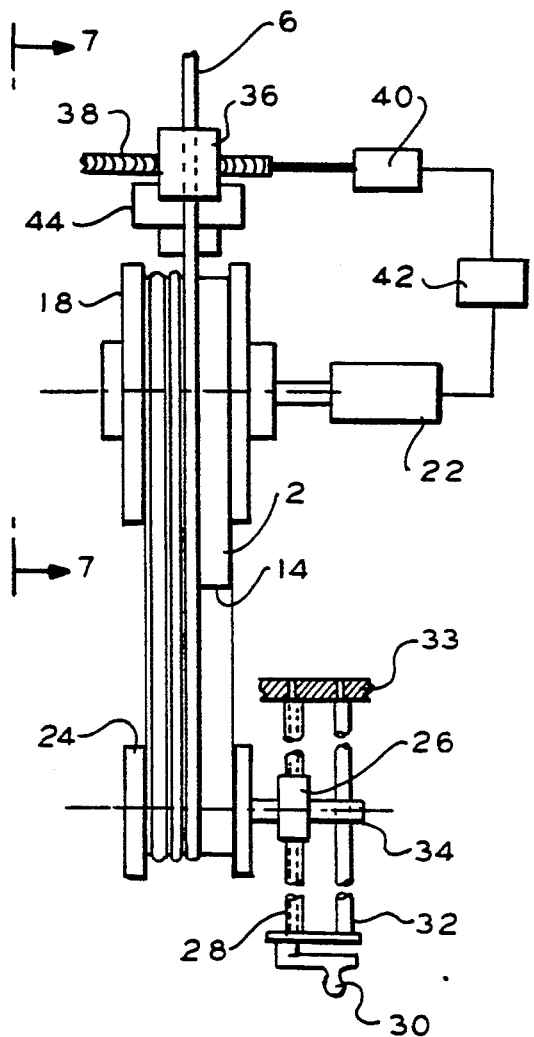
FIG. 5 is a schematic presentation of a device according to the invention.
Figure 7:
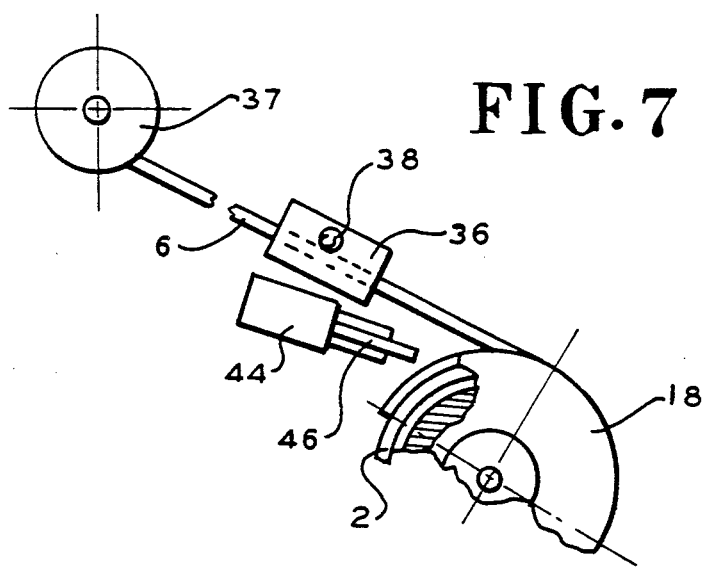
FIG. 7 is a side view of the molding pulley, the guide block and the hot-air blower.

The method according to the invention will be better understood in conjunction with the device represented in the schematic drawings of FIGS. 5 to 7, the task of which device is to provide the belting with a continuous, in fact endless, load-carrying layer. There is seen a belt-building or molding pulley 18 (FIGS. 5, 6), the groove profile of which matches the flanks 13 (FIG. 4) of the compression member 2, and which can be rotated either manually or, preferably, by means of variable-speed gearmotor 22. A second, idler, pulley 24 is arranged at a distance from, and in alignment with pulley 18. The idler pulley 24 is rotatably mounted on a block 26 provided with an internal thread and riding on a screw 28 having one degree of freedom in rotation only. Thus, rotating the screw 28 (by means of a handle 30) will cause the block 26, including the idler pulley 24, to perform a translatory movement, permitting the center distance between pulley 18 and the idler pulley 24 to be varied. The bar 32 passing through a fork-like projection 34 attached to the block 26 prevents the latter from rotating about the screw 28, while allowing the above translatory movement. The screw 28 and the bar 32 are mounted between brackets 33 which are obviously stationary relative to the idler pulley 24 and its mounting block 26.

Further seen is a guide block 36 (see also FIG. 7) through which passes the load-carrying member 6, drawn off a supply reel 37, on its way to be wound onto the belt, as will be explained in greater detail further below.

The guide block 36 is capable of a translatory movement in a direction parallel to the axis of a lead screw 38 which, when rotated, will cause the block 36 to perform such a translatory movement. The lead screw 38 is either operated manually or, preferably, is connected to another variable-speed motor 40, the speed of which can be maintained at a predeterminable ratio relative to the gear-motor 22 driving the molding pulley 18, by means of a control element 42. The importance of the controllability of this ratio will be explained further below.

Mounted below the guide block 36 either fixedly or taking part in the translatory movement of the latter, there is seen a blower 44 producing a jet of hot air which nozzle 46 directs towards the point where the load-carrying member 6, having passed the guide block 36, makes contact with the belt surface. Alternatively, the heat required for the bonding process could also be provided by a source of concentrated radiating heat. A source of concentrated ultrasonic vibrations or by source of concentrated electromagnetic oscillations. In the latter case it is, however, required that the material of the cord envelope and/or of the compression member belt comprises small metallic particles.

The compression member 2, having been produced by any of the above-mentioned procedures, is mounted on the two pulleys, the molding pulley 18 and the idler pulley 24 which, by turning handle 30 are then moved part until the compression member belt is fairly tight. The end of the load-carrying member 6 is then drawn off the supply reel 37, threaded through the guide block 36 (which has been set to the initial transversal position, i.e., opposite the left edge of the belt) and attached to the belt, e.g., by being spot-welded to the belt. The hot-air jet (or the respective different heat source) is now turned on and the molding pulley 18 set rotating by actuating the gear motor 22, setting in motion the belt 2, and, thereby dragging long the load-carrying member 6 which, heated by the jet, is bonded to the equally heated (and thereby softened) belt surface. The tightness required for orderly winding is produced by the counter-pull generated by friction offered to the moving load-carrying member as it passes through the guide block 36. Bonding pressure is produced by the same counter-pull due to the deflection of the load-carrying member 6 as it makes contact with the arched portion of the belt surface in the pulley 18. As already mentioned the required pressure could as well or in addition be applied by at least one floating roller (not shown).

As the belt 2 starts moving, drawing along the load-carrying members, the lead screw 38 has also started to rotate, and slowly carries the guide block 36 towards the right. Thus, while rotation of the pulley 18, i.e., movement of the belt, causes the load-carrying member 6 to be wound around the belt 2, the transverse movement of the guide block 36 produces the spiral path that will produce an orderly load-carrying layer 4.

The required relationship between the rotational speed of the pulley 18 and the linear speed of the guide block 36 is not only a function of the width of the belt 2 and the diameter or width of the load-carrying member 6, but also of the surface speed of the belt and on belt length. Hence the importance of the control element 42.

Another configuration calls for stepping action of the guide block 36 at the completion of each revolution of the compression member 2.

Application, to the now reinforced belt of the optional tension member 12 follows similar lines, except that a different guide block is required and that the latter performs no transverse movement, being in fixed alignment with the belt 2. Also, while the nozzle 46 produces a rather narrow hot-air jet, the relatively wide tension member requires a wide and flat jet (or a number of pointed jets).

For use of the device with adhesives, the blower assembly 44, 46 is replaced by an adhesive dispenser. Such dispenser could of course as well be provided in addition to a heat source.

Although the embodiments given to illustrate the inventions describes a plain V-belt, it should be understood that the method and device discussed are also suitable for the production of other drive-belt types, such as cogged V-belts, flat belts and synchronous or timing belts.

It will be evident to those skilled in the art that the invention is not limited to the details of the foregoing illustrative embodiments and that the present invention may be embodied in other specific forms without departing from the spirit or essential attributes thereof. It would for example also be possible as a first step to spirally wind a load-carrying member on at least one mounting pulley having a substantially flat outer surface, thereby forming a layer comprising plurality but at least more than one full turn and as a second step to wind just one full turn of a pre-formed open-ended compression member profile along and round the outer surface of said layer of said load-carrying member, thereby simultaneously causing said compression member profile in the same manner as explained above to become intimately bonded to said surface of said turns of said wound layer of said load-carrying member. The present embodiments are therefore to be considered in all respects as illustrative and not restrictive. All changes which come within the meaning and range of equivalency of the claims are therefore intended to be embraced therein.

What is claimed is:

1. A method for producing an endless drive belt, comprising the steps of:
    winding a load-carrying member comprising a cord embedded in a solid but softenable elastic material comprising a second elastomer along and around a surface of a compression member belt comprising a solid but softenable elastic material comprising a first elastomer fusible with the second elastomer thereby forming a layer comprising a plurality but at least more than one full turn; and simultaneously
    causing the turns of said wound layer of said load-carrying member to become intimately bonded to said surface of said compression member belt by softening of surface layers of both said load-carrying member and said compression member belt which are to come into contact with each other to at least such degree to allow the material of said surface layers to fuse.

2. The method as claimed in claim 1, comprising the further steps of:
    winding at least one, full turn of pre-formed open-ended tension member profile comprising a solid but softenable elastic material comprising a third elastomer being fusible with said second elastomer around, and on top of, said layer of said load-carrying member; and simultaneously
    causing said at least one turn of said tension member profile to become intimately bonded to said load-carrying layer by softening of surface layers of both said load-carrying layer and said tension member profile coming into contact with each other to at least such degree to allow the material of said surface layers under the pressure applied to fuse.

3. The method of claim 1 wherein pressure is applied during said winding to at least partially impress said turns in said surface of the compression member belt.

4. The method as claimed in claim 3, wherein the thickness of the softened surface layer of the load-carrying member is smaller than the thickness of the solid but softenable elastic material in which the cord is embedded.

5. The method as claimed in claim 4, wherein the surface layers of said members coming into contact with each other are softened to at least such degree to allow the materials of said surface layers to flow into and to fill up hollow spaces between said members and to allow said turns of said load-carrying member to be at least 20% impressed in said surface of said compression member belt.

6. The method as claimed in claim 3 wherein the turns of said load-carrying member forming said layer are wound across the substantially entire width of said surface of said compression member belt.

7. The method as claimed in claim 3, wherein said softening is carried out by the application of heat.

8. The method as claimed in claim 7, wherein said heat is applied by means of a hot-air nozzle.

9. The method as claimed in claim 7, wherein said heat is applied by a source of concentrated radiating heat.

10. The method as claimed in claim 7, wherein said heat is applied by a source of concentrated ultrasonic mechanical vibrations.

11. The method as claimed in claim 7, wherein the material of at least one of the members to be bonded to each other comprises metallic particles and wherein said heat is applied by a source of concentrated electromagnetic oscillations.

12. The method as claimed in claim 3, wherein said softening is carried out by the application of an adhesive.

13. The method as claimed in claim 3, wherein said softening is carried out both by the application of heat and of an adhesive.

14. The method as claimed in claim 3, wherein said pressure is applied by keeping said load-carrying member taut during the winding thereof.

15. The method as claimed in claim 3, wherein said pressure is applied by means of at least one floating roller.

16. The method as claimed in claim 3, wherein said first and second elastomers are mainly thermoplastic elastomer.

17. The method as claimed in claim 1, wherein said turns of said load-carrying member are at least 20% impressed into said surface of said compression member belt and wherein the surface layers of said members coming into contact with each other are softened to at least such a degree as to allow the materials of said surface layers to flow and to fill up hollow spaces between said members.

18. An endless drive belt, comprising:
   a compression member belt having a surface, said compression member comprising softenable solid elastic material comprising a first elastomer; and
   a load-carrying layer, constituted by a plurality but at least more than one full turn of a load-carrying member wound along and around said surface of said compression member belt, said load-carrying member comprising a cord embedded in an envelope comprising a softenable solid elastic material comprising a second elastomer being fusible with said first elastomer;
   wherein said turns of said wound layer of said load-carrying member are intimately bonded to said surface of said compression member belt, the interface between said turns and said surface comprising fused material from both an adjacent surface layer of said envelope of said cord of said load-carrying member and an adjacent surface layer of said surface of said compression member belt, said turns being at least partially impressed in said surface.

19. The endless drive belt as claimed in claim 18, wherein the material of said cord is selected from a group comprising cotton, rayon, polyester, aramid, and the like.

20. The endless drive belt as claimed in claim 18, wherein said cord is cord that has been heat treated prior to having become coated with said solid, but softenable elastic material.

21. The endless drive belt as claimed in claim 18, wherein said cord is a cord that has been coated with an aqueous epoxy primer and/or an adhesive prior to having become embedded in said solid, but softenable elastic material.

22. The endless drive belt as claimed in claim 18, wherein said cord consists of at least two mechanically combined materials, one of high strength and one of good natural adhesion to the material in which said cord is embedded.

23. The endless drive belt as claimed in claim 18, wherein said turns substantially cover the entire width of said surface.

24. The endless drive belt as claimed in claim 18, wherein said turns are at least 20% impressed in said surface of said compression member belt.

25. The endless drive belt as claimed in claim 18, further comprising around, and on top of, said wound layer of said load-carrying member a tension member comprising a softenable solid elastic material comprising a third elastomer being fusible with said second elastomer, wherein said tension member is intimately bonded to said wound layer, the interface between said wound layer and said tension member comprising fused material from both an adjacent surface layer of said envelope of said cord of said load-carrying member and an adjacent surface layer of said tension member.

26. A method of producing belting, comprising the steps of:
   contacting a surface of a compression member with a load-carrying member, the surface of the compression member including a solidified but softenable first elastomer, the load-carrying member including a cord having a covering, the surface of which covering includes a solidified but softenable second elastomer, the first and second elastomers being fusible with each other; and
   intimately bonding together the surfaces of the compression member and the covering by softening both surfaces just before they come into contact, so that the first and second elastomers fuse and so that the load-carrying member is partly impressed into the surface of the compression member.

27. A method as set forth in claim 26, wherein:
   the load-carrying member is at least about 20% impressed into the surface of the compression member.

28. A method as set forth in claim 27, which further comprises:
   contacting the protrudent portion of the load-carrying member with a tension member, the surface of the tension member including a solidified but softenable third elastomer which is fusable with the second elastomer; and
   intimately bonding together the surfaces of the tension member and the covering by softening both surfaces ust before they come into contact so that the second and third elastomers fuse and the load-carrying member is impressed into the surface of the tension member.

29. A method as in claim 26, which further comprises:
   maintaining the compression member in an endless-loop configuration during the contacting and bondidng steps, and wherein
   the contacting step is effected by contacting the compression member surface with at least one full turn of the load-carrying member.

30. A method as in claim 29, wherein:
   the load-carrying is impressed into the surface of the compression member by at least about 20%.

31. A method as in claim 26, wherein:
   the surfaces are softened but are not melted or liquified during the bonding step.

32. A method as in claim 26, wherein:
   the thickness of the covering which is softened is less than the thickness of the covering on the cord.

* * * * *